(12) United States Patent
Jabbarnezhad

(10) Patent No.: US 6,493,538 B1
(45) Date of Patent: Dec. 10, 2002

(54) SYSTEM AND METHOD FOR HYBRID SATELLITE AND TERRESTRIAL COMMUNICATION

(75) Inventor: Javid Jabbarnezhad, Allen, TX (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 09/253,402

(22) Filed: Feb. 19, 1999

(51) Int. Cl.[7] .................................................. H04B 7/185

(52) U.S. Cl. ........................................ 455/12.1; 455/427

(58) Field of Search .............................. 455/12.1, 13.1, 455/13.2, 13.3, 427, 428, 429, 430, 450, 452, 455, 517, 518, 519, 520; 370/235, 238, 316–326, 327, 329, 389, 471, 355, 356

(56) References Cited

U.S. PATENT DOCUMENTS

| | | | | |
|---|---|---|---|---|
| 5,195,090 A | * | 3/1993 | Bolliger et al. | 370/314 |
| 5,448,623 A | * | 9/1995 | Wiedeman et al. | 455/430 |
| 5,717,830 A | * | 2/1998 | Sigler et al. | 455/426 |
| 6,073,014 A | * | 6/2000 | Blanchard et al. | 455/428 |

* cited by examiner

Primary Examiner—Lester G. Kincaid
Assistant Examiner—Charles Craver
(74) Attorney, Agent, or Firm—Baker Botts, L.L.P.

(57) ABSTRACT

A system for communicating information between a central site and a remote site includes a central network access device operable to receive a broadcast signal from the central site and to condition the broadcast signal to facilitate its transmission to the remote site using a satellite system. The central network access device further operable to receive from a wide area network an incoming signal originating from the remote site, and to condition the incoming signal for receipt by the central site.

18 Claims, 3 Drawing Sheets

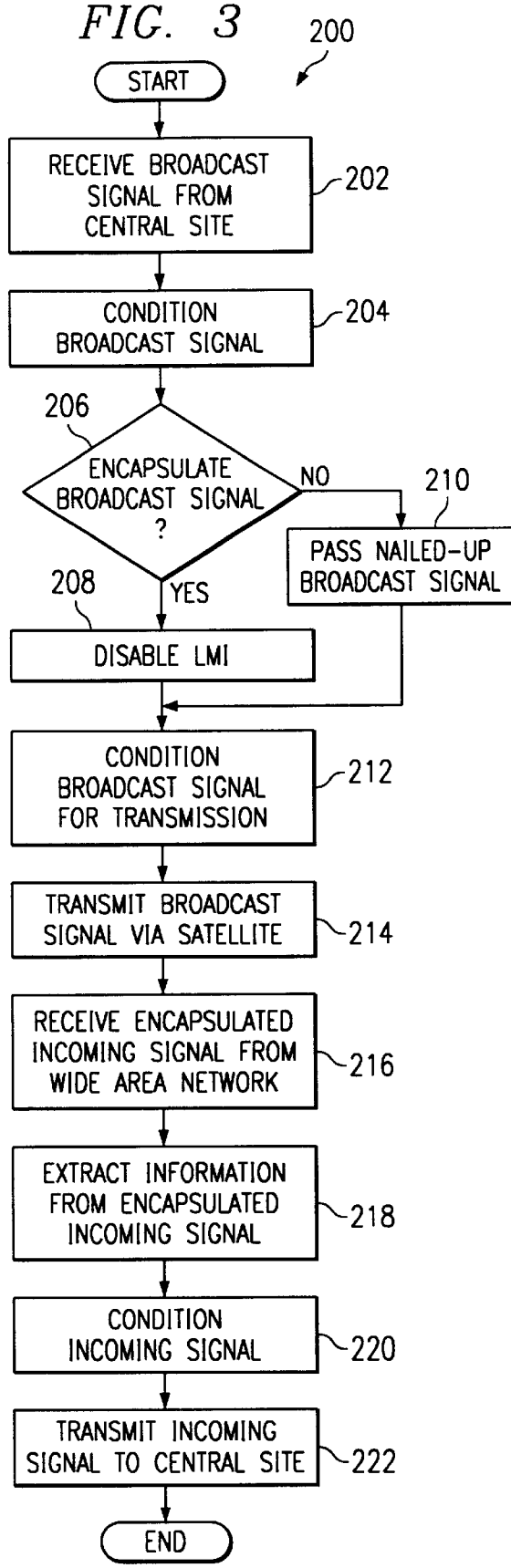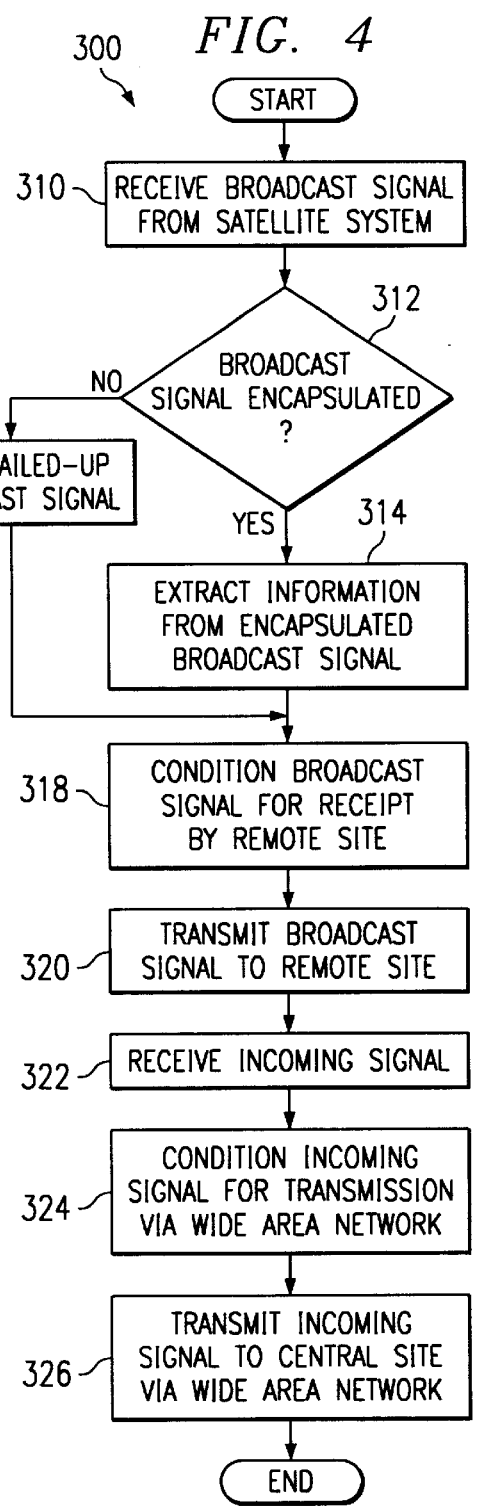

SYSTEM AND METHOD FOR HYBRID SATELLITE AND TERRESTRIAL COMMUNICATION

TECHNICAL FIELD OF THE INVENTION

The present invention relates to the field of data communication, and more particularly to a system and method for hybrid satellite and terrestrial communication.

BACKGROUND OF THE INVENTION

Modern corporations require systems for effectively and efficiently communicating information between a central site and a multitude of geographically dispersed related entities. For example, a petroleum corporation may have its headquarters located in Houston, Texas, and thousands of franchise station locations dispersed throughout the country, or throughout the world. The central corporate headquarters may desire to transmit information to some or all of the remote franchise stations, and the franchise stations may desire to reply to the headquarters' transmission.

One method for communicating between a central site and a plurality of remote sites is to use two-way satellite communications. Communicating information from a central site to a plurality of remote sites can be very effective, particularly where the remote sites are numerous and geographically dispersed, and especially where the central site desires to transmit a common signal to all sites simultaneously. A problem with this approach, however, is that return communications (remote site to central site) are expensive. This expense can be attributed, for example, to the high cost of satellite equipment that must be capable of transmitting as well as receiving information, as well as the cost of purchasing valuable satellite bandwidth. The satellite bandwidth expense is particularly troubling where each remote site is transmitting only a few bits of information, such as a conformation of receipt of the central site's signal. In that case, having thousands of remote sites each purchasing a channel of satellite bandwidth to transmit a few bits of information is extremely wasteful. Still another problem with this method is that conventional satellite communications do not allow for performance monitoring or flow control of the signals being broadcasted.

SUMMARY OF THE INVENTION

In accordance with the present invention, a system and method for hybrid satellite and terrestrial communication are provided that substantially eliminate or reduce disadvantages or problems associated with previously developed systems and methods.

In one embodiment, a system for communicating information between a central site and a remote site includes a central network access device operable to receive a broadcast signal from the central site and to condition the broadcast signal to facilitate its transmission to the remote site using a satellite system. The central network access device is further operable to receive from a wide area network an incoming signal originating from the remote site, and to condition the incoming signal for receipt by the central site.

Technical advantages of the present invention include the provision of a system and method using a satellite system to communicate broadcast signals from a central site to one or more remote sites, and a wide area network to communicate incoming signals from the remote sites back to the central site. The invention provides a highly effective system for two-way communication between a central site and one or more remote sites, while eliminating high costs associated with conventional two-way satellite communication systems. With respect to broadcast signals from the central site to the remote sites, the invention capitalizes on the distance insensitivity and common signal broadcast capabilities of satellite systems. On the return signal side, the invention takes advantage of the significant flexibility and scalability of wide area network communication.

The invention provides an advantage of facilitating functions such as performance monitoring and flow control of signals in either direction. If conservation of bandwidth is important, an encapsulator within the central network access device may be deactivated, resulting in central site transmitting a nailed-up version of the broadcast signal to the remote sites. If, however, a higher level of service is desired, such as having the ability to monitor performance and/or control flow of the broadcast signal, the invention provides the flexibility to encapsulate the broadcast signal to take advantage of these and other features typically associated with wide area network signals.

Network access devices associated with the central site and the remote sites are non-proprietary, standards-based equipment. In other words, signals emerging from each device are based on industry standards and are in a non-proprietary format. In this way, the invention provides an advantage of facilitating hybrid satellite/terrestrial communications without requiring encoding and decoding signals in a proprietary format. Furthermore, off-the-shelf standards-based components, such as frame relay access devices (FRAD) and Very Small Aperture Terminal (VSAT) satellite connection equipment, can be implemented with little or no modification. This enables network customers to implement the present invention with minimal equipment costs by building on their existing equipment investments.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 3 is a flow chart of an exemplary method of communicating information between a central site and at least one remote site using a hybrid satellite and terrestrial communication system; and FIG. 4 is a flow chart showing an exemplary method of communicating information between a remote site and a central site using a hybrid satellite/terrestrial communication system.

DETAILED DESCRIPTION OF THE INVENTION

Figure 1:
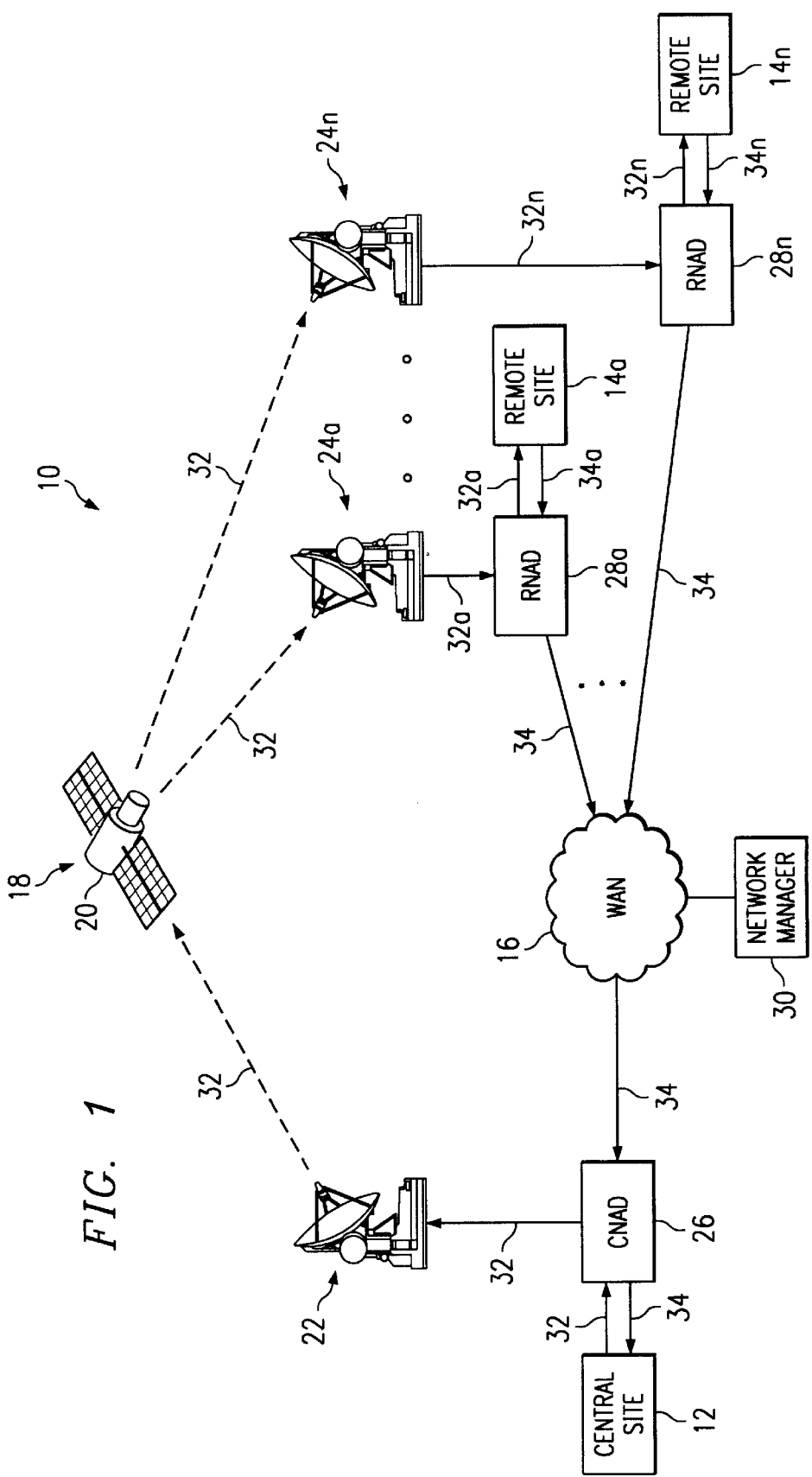
FIG. 1 is a block diagram of an exemplary system for hybrid satellite and terrestrial communication constructed according to the teachings of the present invention.

FIG. 1 is a block diagram of an exemplary system 10 for hybrid satellite and terrestrial communication constructed according to the teachings of the present invention. In the illustrated embodiment, system 10 includes a central site 12 and a plurality of remote sites 14a–14n, referred to generally as remote sites 14. Central site 12 comprises any entity desiring to communicate with one or more remote entities. As an illustrative example, central site 12 comprises a headquarters for a corporation having franchise locations distributed at various locations. Remote sites 14 comprise entities located at some distance from central site 12, which desire to receive communications from central site 12 and to communicate a signal to central site 12 and/or other remote sites 14. In this example, remote sites 14 comprise individual geographically distributed franchise locations of central site 12. Remote sites 14 could be distributed throughout any geographic region throughout the world.

Central site 12 and remote sites 14 communicate using a wide area network 16 and a satellite system 18. Wide area network 16 may comprise, for example, an asynchronous transfer mode (ATM) network, a frame relay network, a Transmission Control Protocol (TCP) network, an Internet Protocol (IP) network, or any combination of these or other wide area network technologies. Wide area network 16 facilitates various functions, such as performance monitoring and flow control, which are not available in systems using only conventional local area network technologies.

Satellite system 18 comprises any system operable to facilitate transmission of signals from one location to another using an orbiting satellite. In this embodiment, satellite system 18 comprises a Very Small Aperture Terminal (VSAT) satellite system. Satellite system 18 includes a satellite 20, central ground-based satellite equipment 22 associated with central site 12, and remote ground-based satellite equipment 24a–2n associated with remote sites 14a–14n, respectively. Satellite system 18 may further include satellite connection hardware and/or software, such as data port modules, satellite controllers, and/or burst modems to further facilitate the satellite transmission.

In the illustrated embodiment, central ground-based satellite equipment comprises a dish transmitter operable to transmit signals received from central site 12 via satellite 20, and each remote ground-based satellite equipment 24 comprises a dish receiver operable to receive signals from satellite 20. The illustrated embodiment provides an advantage of minimizing equipment costs by eliminating the need for transmission capabilities in the remote ground-based satellite equipment. It should be noted, however, that central ground-based satellite equipment 22 and/or remote ground-based satellite equipment 24 could alternatively comprise transceivers capable of both receiving and transmitting satellite signals.

In the illustrated embodiment, central site 12 communicates information to remote sites 14 over satellite system 18. To help facilitate this communication, system 10 includes a central network access device (CNAD) 26. Central network access device 26 comprises any combination of hardware and software operable to condition signals received from central site 12 for transmission over satellite system 18, and to condition signals received from wide area network 16 for receipt by central site 12. The term "condition," as used in this document, refers to any preparation of a signal to facilitate its receipt by another network element. For example, central network access device 26 may include channel service units (CSU) and data service units (DSU) operable to condition signals for transfer between wide area network 16 and communication equipment at central site 12. Central network access device 26 may also include one or more encapsulators operable to format signals for transmission across wide area network 16 and to extract information from encapsulated signals received from wide area network 16. Central network access device 26 may, but need not include satellite connection equipment such as a data port module, a satellite controller, and a burst modem. Alternatively, these components could reside separately from central network access device 26. Additional details of the structure and function of central network access device 26 will be described below.

Remote sites 14, in this embodiment, communicate information back to the central site using wide area network 16. To help facilitate this communication, each remote site 14a–14n is associated with a remote network access device (RNAD) 28a–28n, respectively. Remote network access device 20 comprises any combination of hardware and software operable to condition signals received from the respective remote site 14 for transmission over wide area network 16, and to condition signals received from satellite system 18 for receipt by the associated remote site 14. For example, each remote network access device 28 may include channel service units and data service units, as well as one or more signal encapsulators. Remote network access devices 28 may, but need not include satellite connection equipment, such as a data port module and a burst modem. Alternatively, these components could reside separately from remote network access devices 28. Additional details of the structure and function of remote network access devices 28 will be described below.

Although central network access device 26 is depicted as being located externally from central site 12, the invention is not so limited. Central network access device 26 could reside in any location at or accessible to central site 12 without departing from the scope of the invention. Likewise, remote network access devices 28 could be located at any location at or accessible to remote sites 14 without departing from the scope of the invention.

System 10 also includes a network manager 30. Network manager 30 comprises hardware and software operable to organize, monitor, and report on a network topology involving central site 12 and remote sites 14.

In operation, central site 12 passes a broadcast signal 32, which it desires to transmit to one or more remote sites 14, to central network access device 26. Central network access device 26 receives broadcast signal 32 and conditions the signal for transmission over satellite system 18. Central network access device 26 passes broadcast signal 32 to satellite transceiver 22, which transmits the signal over satellite 20 to remote satellite receivers 24. Each remote network access device 28a–28n receives a respective broadcast signal 32a–32n and conditions that signal for receipt by the associated remote site 14.

In response to receiving broadcast signal 32, or on its own initiative, a particular remote site 14 may desire to send a signal back to central site 12. In that case, remote site 14 passes an incoming signal 34 ('incoming' from the perspective of the central site) to its associated remote network access device 28. Remote network access device 28 receives incoming signal 34 and conditions the signal for transmission over wide area network 16. Remote network access device 28 then transmits the conditioned incoming signal 34 to wide area network 16 for communication to central site 12. Central network access device 26 receives incoming signal 34 from wide area network 16, and conditions incoming signal 34 for receipt by central site 12. Central network access device 26 then communicates incoming signal 34 to central site 12.

Combining the technologies of satellite and wide area network communication systems allows the present invention to enjoy the strengths of both technologies while avoiding shortcomings associated with each. For example, communication over a satellite system is advantageous where the receiving sites are located at various dispersed locations. Satellite communication is especially appealing where one site desires to communicate a common signal to a multitude of other remote sites. A satellite system's distance insensitivity and common signal broadcast capabilities make it ideal for such an application.

Wide area networks, on the other hand, provide significant flexibility and scalability in transmission. Where several remote locations desire to send messages to a central site, wide area network communication provides an economical alternative to two-way satellite communications. This is especially true where the messages transmitted by the remote sites comprise only a few bits of information. In that case, using and paying for a full 64 Kbit channel to transmit only a few bits of information wastes costly satellite bandwidth. Scalable wide area network technologies allow remote sites to use only the bandwidth they need. In addition, wide area network technologies provide enhanced functionality over conventional satellite communications or local area network technologies, such as performance monitoring and flow control.

Figure 2:
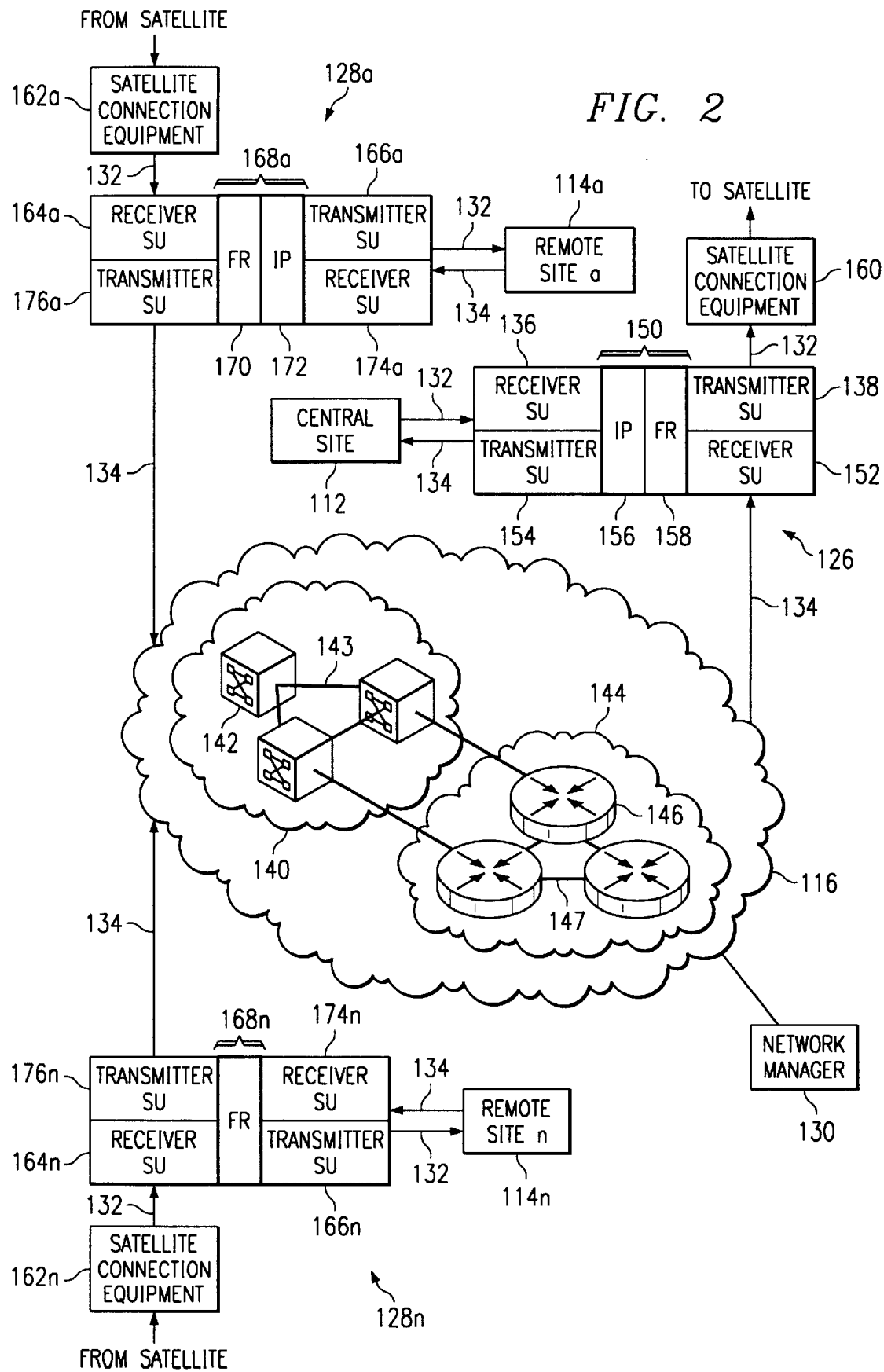
FIG. 2 is a block diagram of an exemplary embodiment of a system for hybrid satellite and terrestrial communication constructed according to the teachings of the present invention.

FIG. 2 is a block diagram of an exemplary embodiment of a system 110 for hybrid satellite and terrestrial communications constructed according to the teachings of the present invention. System 110 includes a central network access device 126, which is associated with a central site 112. In a particular embodiment, central site 112 may comprises a corporate headquarters for a petroleum company. System 110 also includes a plurality of remote network access devices 128a–128n. Each remote network access device 128 is associated with a remote site 114. As a particular example, each remote site 114 may comprise a franchise station of the petroleum company described above.

Central site 112 communicates information to one or more remote sites 114 over a satellite system (not explicitly shown). Remote sites 114 communicate information back to central site 112 through a wide area network 116. Wide area network 116 may comprise, for example, an asynchronous transfer mode (ATM) network, a frame relay network, an Internet Protocol (IP) network, a Transmission Control Protocol (TCP) network, or any combination of wide area technology networks. In this particular embodiment, wide area network 116 includes a frame relay network 140 having a plurality of frame relay switches 142 interconnected by communication links 143. Wide area network 116 further includes a router network 144 having a plurality of routers 146 interconnected by communications links 147. Signals may be passed from remote sites 114 to central site 112 through frame relay network 140, router network 144, or a combination of those networks.

Central network access device 126 operates to receive a broadcast signal 132 from central site 112, and to condition broadcast signal 132 for transmission over a satellite system to remote network access devices 128 associated with remote sites 114. Central network access device 126 includes a receiver service unit (RECEIVER SU) 136 and a transmitter service unit (TRANSMITTER SU) 138. Receiver service unit 136 and transmitter service unit 138 each comprise a combination channel service unit/data service unit (CSU/DSU) operable to receive broadcast signal 132 and to condition broadcast signal 132 for transmission. Specifically, receiver service unit 136 operates to receive broadcast signal 132 from central site 112, and to condition broadcast signal 132 to be formatted by an encapsulator 150.

Details regarding the structure and function of encapsulator 150 will be described below.

Depending on whether encapsulator 150 has been enabled, transmitter service unit 138 receives either an encapsulated form or a nailed-up form of broadcast signal 132 from encapsulator 150. Transmitter service unit 138 conditions broadcast signal 132 for transmission to the next network element, and passes broadcast signal 132 to satellite connection equipment 160. Satellite connection equipment 160 includes, for example, a data port module, a satellite controller, and a burst modem. This equipment further conditions broadcast signal 132 for transmission over the satellite system, and coordinates with the satellite system to facilitate the transmission of broadcast signal 132.

Central network access device 126 further operates to receive incoming signals 134 from one or more remote sites 114, and to condition incoming signals 134 for receipt by central site 112. In furtherance of this functionality, central network access device 126 includes a receiver service unit (RECEIVER SU) 152 and a transmitter service unit (TRANSMITTER SU) 154. Receiver service unit 152 and transmitter service unit 154 each comprise a combination CSU/DSU operable to condition incoming signals 134 from wide area network 116. Specifically, receiver service unit 152 operates to receive encapsulated incoming signals 134 from wide area network 116, and to condition those signals for formatting by encapsulator 150. Transmitter service unit 154 receives an extracted portion of encapsulated incoming signal 134 from encapsulator 150, and further conditions incoming signal 134 for receipt by central site 112.

Encapsulator 150 comprises a device operable to facilitate transmission and receipt of wide area network signals. In one mode of operation, encapsulator 150 operates to encapsulate signals received from central site 112 to place those signals into a format suitable for transmission over a wide area network. For example, encapsulator 150 may comprise a frame relay access device (FRAD), capable of placing signals received from central site 112 into a frame relay format.

In another aspect of operation, encapsulator 150 operates to extract information from incoming wide area network signals 134 to facilitate transmission of the payload of those signals to central site 112, and to facilitate performance monitoring and flow control of incoming signals 134.

In this embodiment, encapsulator 150 comprises both an Internet Protocol encapsulator 156 and a frame relay encapsulator 158. Depending on various factors, such as the level of service desired and the bandwidth limitations imposed by central site 112, either one, both, or neither of encapsulators 156 and 158 may be active at any given time. For example, conventional transmission of satellite signals typically does not involve an encapsulator because encapsulating broadcast signal 132 would require additional data bits, which takes up additional bandwidth. The relatively higher costs of transmitting data over satellite systems typically makes minimizing bandwidth desirable, and generally precludes employing an encapsulation technique. A drawback to not encapsulating the signal, however, is that features such as performance monitoring and flow control of broadcast signal 132 are generally unavailable.

System 110 provides an advantage in allowing a choice of whether encapsulator 150 will be active. If conservation of bandwidth is important, encapsulator 150 may be deactivated, resulting in central network access device 126 passing a nailed-up version of broadcast signal 132 to the satellite for transmission. If, however, a higher level of service is desired, such as having the ability to monitor performance and/or control flow of broadcast signal 132, system 110 provides the flexibility to encapsulate broadcast signal 132 to take advantage of these and other features typically associated with wide area network signals.

Where encapsulator 150 is used to place broadcast signal 132 into an encapsulated form, it may be desirable to modify the format of the signal to facilitate proper receipt by remote network access devices 128. For example, if encapsulator 150 operates to place broadcast signal 132 into a frame relay format prior to transmission over the satellite system, it is desirable to disable or not to use a local management interface (LMI) frame of the signal to ensure that remote network access device 128 does not reject the signal.

Frame relay specifications typically include LMI extensions that provide additional functionality in processing frame relay signals. One such extension is a virtual circuit status message, which reports on the status of permanent virtual channels (PVC) between a sending node and a receiving node. This extension prevents signals from being sent to nodes that are not properly connected by a permanent virtual channel. Where, as in system 110, broadcast signal 132 is encapsulated and transmitted over a satellite, there are no permanent virtual channels involved in the transmission. If remote network access device 128 were to receive an indication that central network access device 126 was attempting to send broadcast signal 132 having an active virtual circuit status message LMI, remote network access device 128 would likely refuse to accept the signal upon recognizing that there is no PVC supporting the transmission. To avoid this situation, it may be desirable to disable some or all LMI extensions when encapsulating broadcast signal 132.

Each remote site 114 is associated with a remote network access unit 128. Remote network access units 128 receive broadcast signal 132 from the satellite system at associated satellite connection equipment 162. Satellite connection equipment 162 associated with each remote site is similar to satellite connection equipment 160 associated with central site. In this particular embodiment, however, satellite connection equipment 162 does not comprise a satellite controller because remote sites transmit information to central site 112 using wide area network 116 instead of a satellite system. In addition, where satellite connection equipment 162 is receive-only equipment, the data port module and burst modem of satellite connection equipment 162 are generally less expensive than that equipment would be if system 110 required two-way satellite communications.

Of course, satellite connection equipment 162 could include transmission equipment to facilitate two-way satellite communications. In the illustrated embodiment, however, restricting return communications to wide area network 116 provides significant cost savings in eliminating expensive satellite transmission equipment associated with conventional 2-way satellite communications.

Each remote network access device 128 includes a receiver service unit (RECEIVER SU) 164 and a transmitter service unit (TRANSMITTER SU) 166. Receiver service unit 164 and transmitter service unit 166 each comprise a combination CSU/DSU operable to receive broadcast signal 132 and to condition broadcast signal 132 for receipt by the associated remote site 114. As previously discussed, in transmitting satellite signals there is a tradeoff between the level of service provided and the bandwidth required for broadcast signal 132. In some cases, conservation of bandwidth takes priority, necessitating deactivation of encapsulator 150 of central network access device 126 to facilitate transmission of a nailed-up broadcast signal 132. In other cases, a customer may desire a particular level of service, regardless of the additional bandwidth associated with that service. In that case, encapsulator 150 is enabled to place broadcast signal 132 into an appropriate wide area network format, such as a frame relay format.

Receiver service unit 164 operates to receive either an encapsulated form or a nailed up form of broadcast signal 132 from satellite connection equipment 162, depending on whether encapsulator 150 was activated upon transmission of broadcast signal 132. If broadcast signal 132 is encapsulated in a wide area network format, receiver service unit 164 conditions broadcast signal 132 for receipt by an encapsulator 168, where information will be extracted from the encapsulated broadcast signal 132 for transmission to remote site 114. In addition, various performance monitoring activities, such as cyclic redundancy checking of broadcast signal 132 may occur. If, on the other hand, broadcast signal 132 emerges at receiver service unit 164 in a nailed-up form, receiver service unit 164 passes nailed up broadcast signal 132 directly to transmitter service unit 166, where it is conditioned for receipt by the associated remote site 114.

As discussed, encapsulator 168 is capable of extracting information from an encapsulated broadcast signal 132 to facilitate transmission of the payload of broadcast signal 132, as well as facilitating performance monitoring and flow control of that signal. In addition, encapsulator 168 operates to receive incoming signals 134 from remote site 114 for transmission to central site 112 over wide area network 116. To help facilitate this transmission, encapsulator 168 operates to format incoming signal 134 by placing the signal into a wide area network format, such as a frame relay, ATM, or TCP/IP format.

In the illustrated embodiment, encapsulator 168a includes two separate encapsulators; a frame relay (FR) encapsulator 170, and an Internet Protocol (IP) encapsulator 172. Depending on the characteristics of wide area network 116 and the desires of remote site 114, either one, both, or neither of encapsulators 170 and/or 172 may be active.

For example, suppose remote site 114a, which is located in New York, N.Y., desires to transmit incoming signal 134 to central site 112 located in Houston, Tex., and desires that the signal pass through a frame relay switch 142 located in Dallas, Tex. In that case, remote network access device 128a activates frame relay encapsulator 170 to place incoming signal 134 into a frame relay format, encoding the necessary address data to ensure passage of incoming signal 134 through frame relay switch 142 as desired.

As a further example, suppose remote site 114a desires to transmit incoming signal 134 to central site 112 without preference as to which path the signal takes to get there. In that case, it may be more economical and/or efficient for remote network access device 128a to pass incoming signal 134 through router network 144. To facilitate this transmission, remote network access device 128a activates IP encapsulator 172 to format incoming signal 134 in an Internet Protocol format. In this case, frame relay encapsulator 162a is deactivated because incoming signal 134 will not be traversing frame relay network 140.

Each remote network access device 128 also includes a receiver service unit (RECEIVER SU) 174 and a transmitter service unit (TRANSMITTER SU) 176. In this embodiment, receiver service unit 174 and transmitter service unit 176 comprise combination CSU/DSU devices operable to receive incoming signals 134, and to condition incoming signals 134 for transmission over wide area network 116. In particular, receiver service unit 174 receives incoming signals 134 from associated remote site 114 and conditions those signals for receipt by encapsulator 168. Transmitter service unit 176 receives encapsulated incoming signals 134 from encapsulator 168 and conditions those signals for transmission over wide area network 116.

Although central network access device 126 and remote network access devices 128 are shown as comprising separate receiver service units, transmitter service units, and encapsulators, these components or any portion thereof may alternatively be configured as a single integral unit. Likewise, these components could also reside as stand-alone device. The invention is not intended to be limited by the configuration of these components.

In the illustrated embodiment, each of network access devices 126 and 128 comprise non-proprietary, standards-based network access devices. In other words, signals emerging from each device are based on industry standards and are in a non-proprietary format. In this way, system 110 provides an advantage of facilitating hybrid satellite/terrestrial communications without requiring encoding and decoding signals in a proprietary format. Furthermore, off-the-shelf standards-based components, such as frame relay access devices (FRAD) and Very Small Aperture Terminal (VSAT) satellite connection equipment can be implemented with little modification. This enables network customers, such as a corporate headquarters and a plurality of associated franchise stations to implement the present invention with minimal equipment costs by building on their existing equipment investments.

System 110 further includes a network manager 130. Network manager 130 provides various functionality including organizing, monitoring, and reporting on network capacity, flow, and usage statistics. Network manager 130 may provide organization for the network by assigning each remote network access device 128 a unique identifier. As a particular example, where wide-area network 116 comprises frame relay network 140, network manager 130 may assign each remote network access device 128 a data link connection identifier (DLCI). Each data link connection identifier specifies a virtual circuit between central network access device 126 and a particular remote network access device 128, and in the process provides an identification of that remote network access device 128 and associated remote site 114. In addition, network manager 130 can assign a particular data link connection identifier to broadcast signals 132 that are intended for receipt by all remote sites 114.

These identifiers provide an advantage of allowing central network access device 126 to automatically identify the source of incoming signal 134 simply by examining the data link connection identifier contained therein. This source identification method provides an advantage over two-way satellite communication, which typically requires separate encoding of the sender's identification into the return signal. Using wide area network 116 for return communications, therefore, saves bandwidth compared to two-way satellite communications. In addition, by encapsulating broadcast signal 132, central site 112 can specify particular ones or all of remote stations 114 for receipt of broadcast signal 132 simply by encoding the signal with an appropriate data link connection identifier.

In this embodiment, network manager 130 monitors traffic on system 110 facilitating report generation and traffic flow control. For example, network manager may pole customer premise equipment and provide reports on bandwidth usage at each remote site 114. This can helm, ensure efficient use of system resources by identifying inefficient network configurations or sites that use more than their allocated bandwidth. Network manager 130 can also provide security for users of system 110 by monitoring and filtering addresses of senders and recipients of the information on system 110.

FIG. 3 is a flow chart of an exemplary method of communicating information between a central site and at least one remote site using a hybrid satellite and terrestrial communication system. The method 200 begins at step 202 where central network access device 126 receives from central site 112 broadcast signal 132 for transmission to remote sites 114. As a particular example, central site 112 may be a headquarters of a petroleum company desiring to transmit a software program to each of its franchise stations (remote sites 114) located at various and multiple locations across the country. Central site 112 sends the software program to be transmitted and an indication of the recipients of the transmission to central network access device 126. Receiver service unit 136 of central network access device 126 receives this information in the form of broadcast signal 132, and conditions broadcast signal 132 at step 204 for further processing by central network access device 126.

Central network access device 126 may designate the recipients of broadcast signal 132, for example, by encoding the data link connection identifiers associated with each recipient remote site 114 in to the address portion of the encapsulated signal. In this example, central site 112 desires that all remote sites 114 receive broadcast signal 132. To facilitate this transmission, encapsulator 150 encodes into broadcast signal 132 a broadcast data link connection identifier, which is associated with all remote sites 114.

Encapsulator 150 receives broadcast signal 132 and may or may not encapsulate broadcast signal 132 at step 206. In some cases, central site 112 may desire to take advantage of features such as performance monitoring and flow control offered by encapsulating broadcast signal 132. In that case, broadcast signal 132 is encapsulated at step 206. Where broadcast signal 132 is encapsulated, for example in a frame relay format, it is desirable to disable the local management interface frame of the signal at step 208. Disabling the local management interface frame of broadcast signal 132 insures that remote network access devices 128 will not reject broadcast signal 132 due to a lack of an operable permanent virtual channel associated with broadcast signal 132.

If, on the other hand, central site 112 places a higher premium on conserving bandwidth than on monitoring the performance and/or controlling the flow of broadcast signal 132, encapsulator 150 will be bypassed. In that case, receiver service unit 136 will pass a nailed-up version of broadcast signal 132 to transmitter service unit 138 at step 210. Upon receiving either an encapsulated or a nailed-up form of broadcast signal 132, transmitter service unit 138 conditions broadcast signal 132 for transmission to satellite connection equipment 160 at step 212. Satellite connection equipment 160 further conditions broadcast signal 132 for transmission via satellite, and communicates with the satellite system to facilitate the transmission via satellite to remote sites 114 at step 214.

In response to transmitting broadcast signal 132, central network access device may receive incoming signal 134 from wide area network 116 at step 216. Incoming signal 134 represents a communication from remote site 114 transmitted in response to receiving broadcast signal 132. Details of remote site's 114 processing and response to broadcast signal 132 will be described below with respect to FIG. 4.

Receiver service unit 152 of central network access device 126 receives incoming signal 134 at step 216, and conditions that signal for processing by encapsulator 150. Encapsulator 150 extracts information from encapsulated incoming signal 134 at step 218. Central network access device 126 may use a portion of this information to render performance monitoring and/or flow control functionality with respect to incoming signal 134. Transmitter service unit 154 receives an extracted payload from encapsulated incoming signal 134 and conditions the extracted portion at step 220 for transmission to corporate headquarters at step 222.

FIG. 4 is a flow chart showing an exemplary method of communicating information between remote site 114 and central site 112 using a hybrid satellite/terrestrial communication system 110. The method 300 begins at step 310 where satellite connection equipment 162 receives broadcast signal 132 from satellite system 18. Satellite connection equipment 162 processes broadcast signal 132 and conditions it for receipt by remote network access device 128 associated with remote site 114. Receiver service unit 164 of remote network access device 128 receives broadcast signal 132 from satellite connection equipment 162 and conditions it for further processing by transmitter service unit 166 and optionally encapsulator 168.

Encapsulator 168 receives broadcast signal 132 from receiver service unit 168 and determines at step 312 whether broadcast signal 132 is in encapsulated form. If broadcast signal 132 has not been encapsulated, encapsulator 168 sends a nailed-up version of broadcast signal 132 to transmitter service unit 166 at step 316. If, on the other hand, broadcast signal 132 is in encapsulated form, encapsulator 168 extracts information from encapsulated broadcast signal 132 at step 314. Remote network access device 128 may use a portion of the extracted information to facilitate performance monitoring and/or flow control of broadcast signal 132.

Transmitter service unit 166 receives either the extracted payload portion of broadcast signal 132, or a nailed-up version of broadcast signal 132, and conditions broadcast signal 132 at step 318 for receipt by the associated remote site 114. Transmitter service unit 166 transmits broadcast signal 132 to remote site 114 at step 320.

Upon receiving broadcast signal 132, remote site 114 may desire to send a responsive signal back to central site 112. For example, remote site 114 may desire to confirm receipt of the software program, or to notify central site 112 that portions of the software program remains unreceived. In either case, remote site 114 transmits incoming signal 134 ("incoming" from the perspective of central site 112) to the associated remote network access device 128 at step 322.

Remote network access device 128 conditions incoming signal 134 for transmission via wide area network 116 at step 324. This conditioning involves encapsulating incoming signal 134 in to an appropriate format for transmission over wide area network 116. For example, remote site 114 may desire that incoming signal 134 pass through a particular network switch 142 of frame relay network 140. In that case, encapsulator 168 of remote network access device 128 places incoming signal 134 into a frame relay format, encoding appropriate address information to facilitate the desired transmission. Once appropriately formatted, remote network access device 128 transmits incoming signal 134 to central site 112 via wide area network 116 at step 326.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for communicating information between a central site and a remote site, comprising a central network access device operable to:

receive a broadcast signal from the central site and to condition the broadcast signal to facilitate its transmission to the remote site using a satellite system, wherein the central network access device is operable to condition the broadcast signal by placing the broadcast signal into a wide area network format, and wherein the central network access device is operable to place the broadcast signal into a wide area network format by:
  formatting the broadcast signal in a frame relay format; and
  disabling a local management interface frame of the frame relay formatted broadcast signal to facilitate receipt of the formatted broadcast signal at the remote site without the formatted broadcast signal passing through a frame relay switch;

transmit the broadcast signal over the satellite system to the remote site, wherein the broadcast signal is placed into the wide area network format prior to transmitting the broadcast signal over the satellite system;

receive from a wide area network an incoming signal responsive to the broadcast signal and originating from the remote site; and condition the incoming signal for receipt by the central site.

2. The system of claim 1, wherein the wide area network comprises a frame relay network and wherein the incoming signal comprises a frame relay signal.

3. The system of claim 2, wherein the central network access device comprises a signal encapsulator operable to place the broadcast signal into a frame relay format prior to its transmission over the satellite system.

4. The system of claim 1, wherein the wide area network comprises an asynchronous transfer mode network and wherein the incoming signal comprises an asynchronous transfer mode signal.

5. The system of claim 1, further comprising:

a plurality of remote sites, each operable to receive the broadcast signal from a satellite system and to transmit an incoming signal to the central site over a wide area network; and a network manager operable to assign to the broadcast signal a common connection identifier operable to specify a connection between the central site and the plurality of remote sites, and to assign to each incoming signal a unique connection identifier operable to specify a connection between the central site and the remote site originating the incoming signal, the network manager further operable to monitor and report on network statistics.

6. A system for communicating information between a central site and a remote site, comprising a remote network access device operable to:

receive from a satellite system a broadcast signal originated at the central site and to condition the broadcast signal for receipt by the remote site, wherein the broadcast signal was conditioned for transmission over the satellite system prior to being transmitting over the satellite system, and wherein the broadcast signal was conditioned by being placed into a wide area network format, the wide area network format comprising a frame relay format with a disabled local management interface frame, the disabled local management interface frame facilitating receipt of the formatted broadcast signal at the remote site without the formatted broadcast signal passing through a frame relay switch; and receive an incoming signal responsive to the broadcast signal from the remote site and to condition the incoming signal to facilitate its transmission to the central site using a wide area network.

7. The system of claim 6, wherein:

the broadcast signal comprises an encapsulated signal; and the remote network access device comprises a signal encapsulator operable to receive the broadcast signal and to extract information from the broadcast signal to facilitate performance monitoring or flow control of the broadcast signal.

8. The system of claim 6, wherein the wide area network comprises a frame relay network and wherein the incoming signal comprises a frame relay signal.

9. The system of claim 6, wherein the wide area network comprises an asynchronous transfer mode network and wherein the incoming signal comprises an asynchronous transfer mode signal.

10. A system for communicating information between a central site and a plurality of remote sites comprising:

a central network access device operable to receive a broadcast signal from the central site and to process the broadcast signal to facilitate its transmission to at least one of the plurality of remote sites using a satellite system, wherein the central network access device is operable to process the broadcast signal by placing the broadcast signal into a wide area network format, and wherein the central network access device is operable to place the broadcast signal into a wide area network format by formatting the broadcast signal in a frame relay format and disabling a local management interface frame of the frame relay formatted broadcast signal to facilitate receipt of the formatted broadcast signal at the remote sites without the formatted broadcast signal passing through a frame relay switch; and a plurality of remote network access devices, each associated with a remote site and operable to receive the broadcast signal from the satellite system and to process the broadcast signal for receipt by an associated remote site, each remote network access device further operable to receive an incoming signal responsive to the broadcast signal from the associated remote site and process the incoming signal to facilitate its transmission to the central site using a wide area network.

11. The system of claim 10, wherein:

the wide area network comprises a frame relay network; and at least one of the plurality of incoming signals comprises a frame relay signal.

12. The system of claim 11, wherein the central network access device comprises a signal encapsulator operable to place the broadcast signal into a frame relay format prior to its transmission over the satellite system.

13. The system of claim 10, wherein:

the wide area network comprises an asynchronous transfer mode network; and at least one of the plurality of incoming signals comprises an asynchronous transfer mode signal.

14. The system of claim 10, further comprising a network manager operable to assign to the broadcast signal a common connection identifier operable to specify a connection between the central site and the plurality of remote sites, and to assign to each incoming signal a unique connection identifier operable to specify a connection between the central site and the remote site originating the incoming signal, the network manager further operable to monitor and report on network statistics.

15. A method of communicating information between a central site and a remote site using a hybrid satellite and terrestrial communication system, the method comprising:

conditioning a broadcast signal from the central site for transmission over a satellite system by placing the broadcast signal into a wide area network format, wherein placing the broadcast signal into a wide area network format comprises:

formatting the broadcast signal in a frame relay format; and disabling a local management interface frame of the frame relay formatted broadcast signal to facilitate receipt of the formatted broadcast signal at the remote site without the formatted broadcast signal passing through a frame relay switch;

transmitting the broadcast signal over the satellite system to the remote site, wherein the broadcast signal is placed into the wide area network format prior to transmitting the broadcast signal over the satellite system;

receiving an incoming signal from a wide area network, the incoming signal originating at the remote site and responsive to the broadcast signal; and conditioning the incoming signal for receipt by the central site.

16. The method of claim 15, wherein the plurality of remote sites are associated with the central site, and further comprising:

assigning a broadcast identifier applicable to all associated remote sites;

placing the broadcast signal into a wide area network format;

encoding an address portion of the formatted broadcast signal with the broadcast identifier; and transmitting the broadcast signal over the satellite system to all associated remote sites.

17. A method of communicating information between a central site and a remote site using a hybrid satellite and terrestrial communication system, the method comprising:

conditioning a broadcast signal from the central site for transmission over a satellite system by placing the broadcast signal into a wide area network format, wherein placing the broadcast signal into a wide area network format comprises:

formatting the broadcast signal in a frame relay format; and disabling a local management interface frame of the frame relay formatted broadcast signal to facilitate receipt of the formatted broadcast signal at the remote site without the formatted broadcast signal passing through a frame relay switch; and transmitting the broadcast signal over the satellite system to the remote site, wherein the broadcast signal is placed into the wide area network format prior to transmitting the broadcast signal over the satellite system.

18. A system for communicating information between a central site and a remote site, comprising a central network access device operable to:

receive a broadcast signal from the central site and to condition the broadcast signal to facilitate its transmission to the remote site using a satellite system, wherein the central network access device is operable to condition the broadcast signal by placing the broadcast signal into a wide area network format, and wherein the central network access device is operable to place the broadcast signal into a wide area network format by:

formatting the broadcast signal in a frame relay format; and disabling a local management interface frame of the frame relay formatted broadcast signal to facilitate receipt of the formatted broadcast signal at the remote site without the formatted broadcast signal passing through a frame relay switch; and transmit the broadcast signal over the satellite system to the remote site, wherein the broadcast signal is placed into the wide area network format prior to transmitting the broadcast signal over the satellite system.

* * * * *